United States Patent
Bowles

[11] Patent Number: 6,131,598
[45] Date of Patent: Oct. 17, 2000

[54] FUEL TANK VENTING

[76] Inventor: David Thomas Bowles, Ashlea, Priory Lane Blcknacre, Chelmsford, Essex CM3 4EZ, United Kingdom

[21] Appl. No.: 09/287,243

[22] Filed: Apr. 7, 1999

[51] Int. Cl.[7] .......................... F16K 17/36; F16K 24/02; F02M 33/02

[52] U.S. Cl. .......................... 137/43; 137/574; 137/587; 123/516

[58] Field of Search .................................. 137/587, 574, 137/202, 43; 123/516

[56] References Cited

U.S. PATENT DOCUMENTS

| | | | |
|---|---|---|---|
| 3,800,978 | 4/1974 | Sigwald | 137/587 X |
| 5,054,528 | 10/1991 | Saitoh | 137/587 X |
| 5,275,145 | 1/1994 | Tuckey | 123/516 X |
| 5,392,804 | 2/1995 | Kondo et al. | 137/202 |
| 5,647,334 | 7/1997 | Miller | 137/574 X |
| 5,701,928 | 12/1997 | Aoki | 137/587 X |
| 5,769,057 | 6/1998 | Hashimoto et al. | 123/516 |
| 5,868,119 | 2/1999 | Endo et al. | 123/516 |
| 5,870,997 | 2/1999 | Mukai | 137/574 X |

*Primary Examiner*—John Rivell
*Attorney, Agent, or Firm*—Jerome R. Drouillard

[57] ABSTRACT

A fuel tank venting arrangement for a vehicle comprises a fuel tank (2) including at least two vent ports in its upper surface. Each vent port is provided with a rollover valve (4) and is in fluid flow communication with a back pressure control valve (12). The vent ports are connected together by a single manifold (16) which is secured to the tank (2) to form a fluid-tight seal.

11 Claims, 3 Drawing Sheets

FUEL TANK VENTING

FIELD OF THE INVENTION

The present invention relates to a fuel tank venting arrangement for a motor vehicle.

BACKGROUND OF THE INVENTION

A vehicle fuel tank is vented to allow vapors to move in and out of the tank in order to keep internal pressure in the tank about equal to atmospheric pressure as fuel is drawn from the tank and as internal gas pressures build up.

To reduce atmospheric emissions of fuel, vented vapors may be channeled via a back pressure control valve to a charcoal canister which absorbs and temporarily traps fuel vapor. On restarting the engine, filtered air flows through the canister and carries the fuel vapor away to be burned in the engine. The back pressure valve is used to prevent "trickle filling" of the fuel tank.

The venting system typically comprises two vent ports, one on either side of the top of the fuel tank, both of which are connected to a back pressure valve by pipes. The back pressure valve is in turn connected to a charcoal canister. To prevent fuel from spilling out of the tank in the event of the vehicle turning over or banking steeply, each vent port is provided with a rollover valve ("ROV") which is welded to the tank or mounted by means of a grommet.

A problem with such venting systems is that there are quite a number of places where leakage to atmosphere may occur, namely between each ROV and the tank, between each valve outlet and a pipe, and between each pipe and the back pressure valve. The cost of sophisticated connections to various components is high.

It is an object of the present invention to reduce the above problem.

SUMMARY OF THE INVENTION

According to an aspect of the present invention there is provided a fuel tank venting arrangement for a vehicle, comprising a fuel tank including at least two vent ports in its upper surface, each vent port being provided with a rollover valve and being in fluid flow communication with a back pressure control valve, characterized in that the vent ports are connected together by a single manifold which is secured to the tank to form a fluid-tight seal.

The use of a single manifold reduces the number of potential fuel leakage points. Conventional ROVs and their attachments may be used but, because the manifold provides a barrier to the atmosphere, cheaper, less efficient, alternative valves and valve attachments could be used instead.

The manifold may be formed to provide additional mounting brackets for other components if required.

The use of the manifold is of particular cost benefit where severe evaporative emission requirements pertain, for example in the USA or as mandated under Stage 3 emission requirements in Europe. In such cases, the manifold may be co-extruded and/or formed from a fluorinated plastics material.

The manifold may be secured to the tank by any suitable securing means. In a preferred embodiment the manifold is welded to the tank, but other securing means could also be used, for example a suitable adhesive.

In a preferred embodiment, the manifold is formed from the same plastics material as the tank. The manifold is preferably blow molded, preferably from polyethylene. For convenience hereinafter the invention will described with reference to a blow molded polyethylene manifold which is welded to the tank; however it is to be understood that the invention is not limited to this embodiment.

The manifold can be connected to the back pressure valve through a single outlet pipe, which may be integrally formed in the blow molding process, or which may be subsequently welded to the manifold. Alternatively, the manifold may extend to encompass the back pressure valve, the manifold being welded or otherwise secured to the tank around or directly to the back pressure valve. This reduces the number of potential leakage points further.

BRIEF DESCRIPTION OF THE DRAWINGS

The invention will now be further described, by way of example, with reference to the following drawing in which.

DETAILED DESCRIPTION OF THE PREFERRED EMBODIMENTS

Figure 1:
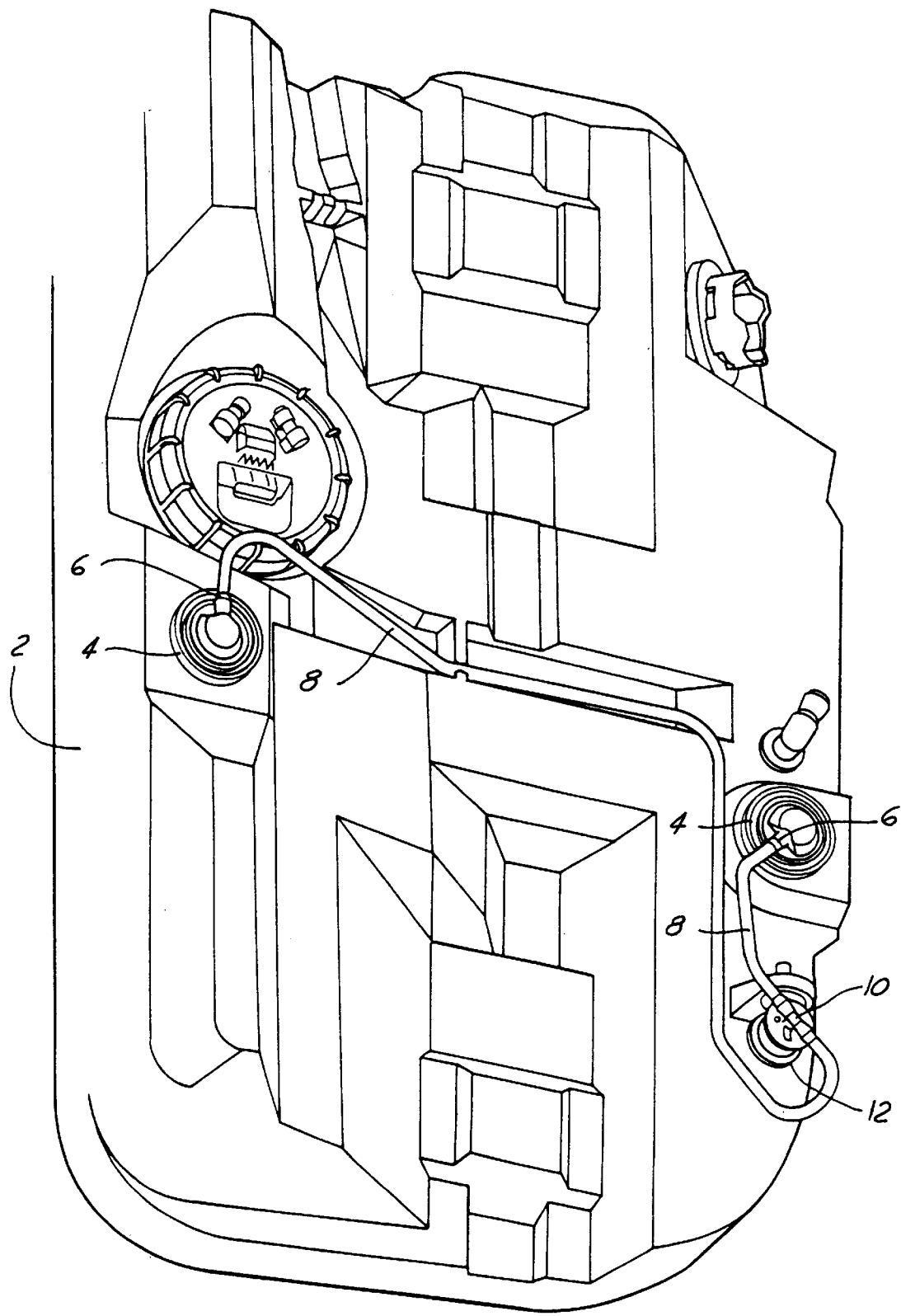
FIG. 1 is a perspective view of a prior art venting arrangement in a known fuel tank.

The known fuel tank 2 shown in FIG. 1 has two ROVs 4 mounted in vent ports on either side of the top of the tank, by means of grommets or welding. Each ROV 4 has an outlet tube 6 which is connected to a T junction 10 of a back pressure valve 12 by pipes 8. Leakage of fuel vapor can occur at any of the junctions between the tank 2 and the ROV 4, the ROV 4 and the pipe 8, and between the pipe 8 and the T junction 10.

Figure 2:
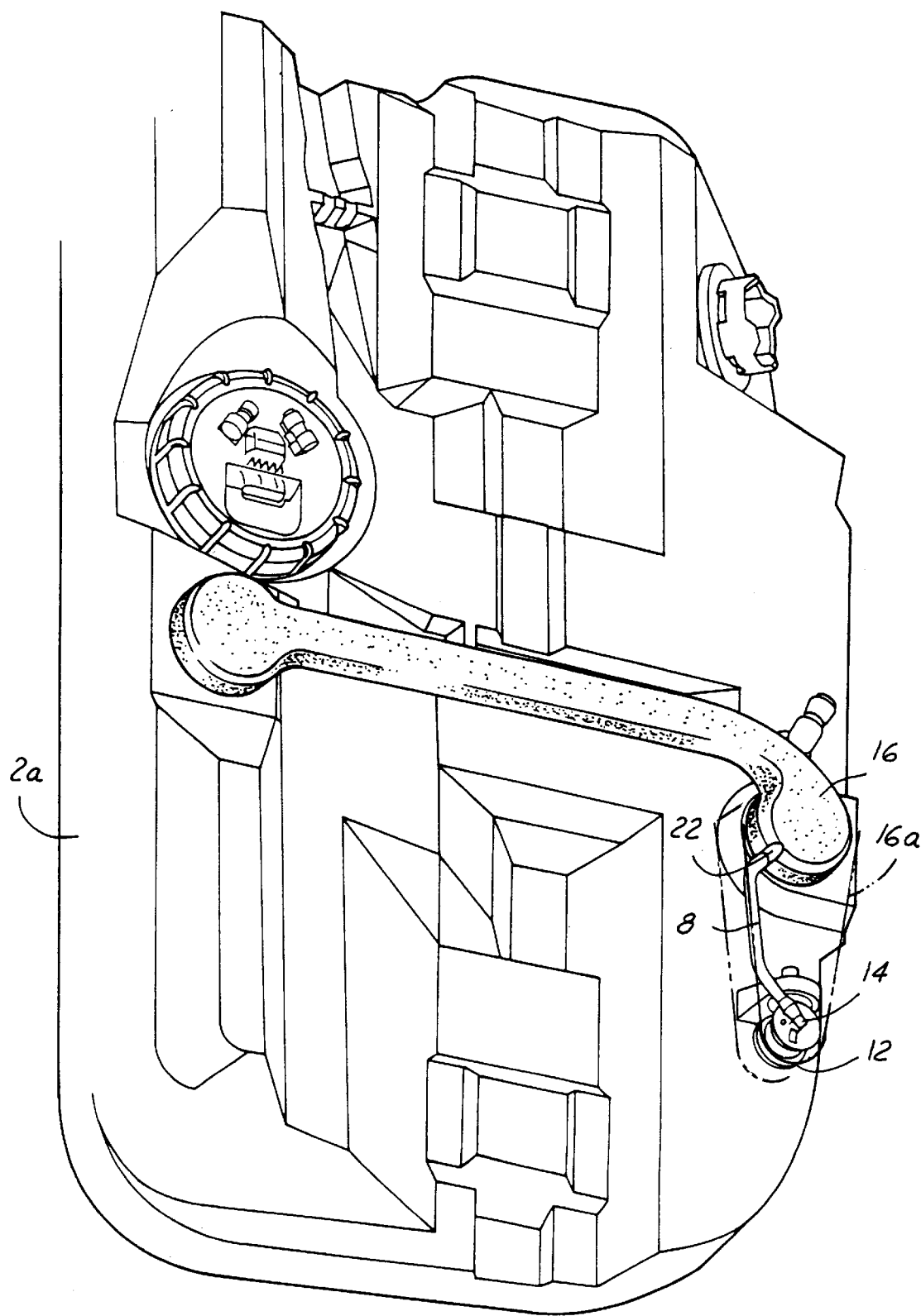
FIG. 2 is a perspective view of a venting arrangement in a fuel tank in accordance with the present invention.
Figure 3:
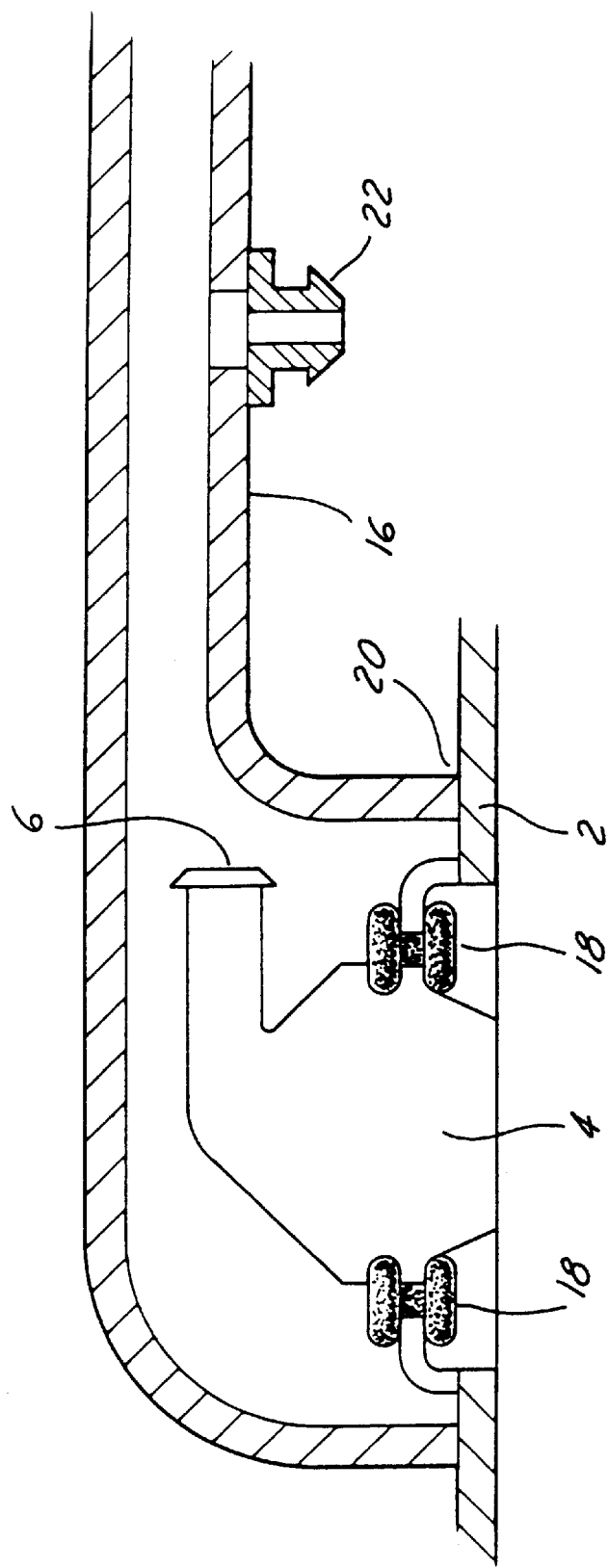
FIG. 3 is a sectional view through part of the arrangement shown in FIG. 2.

Referring now to FIGS. 2 and 3, identical parts are labeled with the same numbers as for FIG. 1. A manifold 16, for example of blow molded polyethylene, is secured to the upper surface of the tank 2 by means of hot plate welded joints 20 to form a fluid tight seal with the tank 2. The manifold 16 encloses both ROVs 4 so that any fuel vapor which escapes between the ROV 4 and the tank 2 will be contained within the manifold 16. This permits cheap or low technology tank attachment grommets 18 to be used to mount the ROVs.

The manifold 16 is connected to an inlet pipe 14 on a back pressure valve 12 by a single pipe 8, via an outlet member 22. The back pressure control valve 12 is connected to a charcoal canister (not shown) which absorbs fuel vapors. The outlet member 22 is hot plate welded to the manifold 16 to provide a fluid tight seal, but could alternatively be formed as part of the manifold 16 during blow molding. "Alternatively, the manifold 16 also includes a portion which extends to encompass the back pressure control valve, as shown in phantom lines and represented generally by reference number 16a in FIG. 2."

Use of the manifold 16 reduces the likelihood of fuel vapor escape to the atmosphere and permits the use of low cost mounting components for valves in the vent ports.

While certain embodiments of the present invention have been described in detail, those familiar with the art to which this invention relates will recognized various alternative designs and embodiments for practicing the invention as defined by the following claims.

I claim:

1. A fuel tank venting arrangement for a vehicle comprising:

a fuel tank including at least two vent ports in its upper surface, each of the vent ports being provided with a rollover valve;

a back pressure control valve in fluid communication with each of the vent ports;

a single manifold, connecting the vent ports, which is secured to the fuel tank to form a fluid-tight seal.

2. A fuel tank venting arrangement as claimed in claim 1, wherein the manifold is made from the same material as the tank.

3. A fuel tank venting arrangement as claimed in claim 1, wherein the manifold is formed by a blow molding process.

4. A fuel tank venting arrangement as claimed in claim 1, wherein the manifold is made of polyethylene.

5. A fuel tank venting arrangement as claimed in claim 1, wherein the manifold is co-extruded.

6. A fuel tank venting arrangement as claimed in claim 1, wherein the manifold is formed from a fluorinated plastic material.

7. A fuel tank venting arrangement as claimed in claim 1, wherein the manifold is formed to provide at least one mounting bracket for other components.

8. A fuel tank venting arrangement as claimed in claim 1, wherein the manifold includes a portion which extends to encompass the back pressure control valve.

9. A fuel tank venting arrangement as claimed in claim 1, wherein the manifold is welded to an upper surface of the tank.

10. A fuel tank venting arrangement for a vehicle comprising:

a fuel tank including at least two vent ports in its upper surface, each of the vent ports being provided with a rollover valve;

a back pressure control valve in fluid communication with each of the vent ports;

a single manifold, connecting the vent ports, which is secured to the fuel tank to form a fluid-tight seal, with the manifold further including a portion which extends to encompass the back pressure control valve.

11. A fuel tank venting arrangement as claimed in claim 10, wherein the manifold is formed to provide at least one mounting bracket for other components.

* * * * *